Patented Sept. 14, 1926.

1,599,854

UNITED STATES PATENT OFFICE.

MORRIS C. VAN GUNDY, OF HOUSTON, AND JOSEPH R. SCANLIN, OF PORT ARTHUR, TEXAS, ASSIGNORS TO THE TEXAS COMPANY, OF NEW YORK, N. Y., A CORPORATION OF TEXAS.

MANUFACTURE OF LUBRICANTS.

No Drawing.  Application filed September 21, 1923.  Serial No. 664,096.

This invention relates to the preparation of lubricating compositions adapted particularly for bearings carrying heavy loads and subjected to high temperatures.

Difficulty has been experienced in providing suitable greases for locomotive driving journals and for other heavy high speed bearings wherein considerable heat is generated. We have found that what is perhaps the chief defect in driving journal greases, as they have been made in the past, is the presence of substantial quantities of moisture. Analyses of these greases show that they ordinarily contain 7% to 15%, and sometimes greater proportions, of water. In use these lubricating compositions are subjected to temperatures approaching the boiling point of water and even higher with the result that the contained water is vaporized. The formation of the steam causes the grease to puff so that the grease is pushed out of the bearing. The greater part of the water present in the composition may eventually be driven out by reason of the high temperature, leaving a product that is of a dry and crumbling nature and of little or no lubricating value which will not feed onto the bearing properly with the result that increase in the temperature of the bearing occurs and finally carbonization of the grease takes place.

The primary object of the invention is to provide a lubricating composition that shall be free from any material quantity of water or moisture and to provide a lubricant of desired characteristics that in use shall be substantially stable in respect thereof.

Another object is to provide a grease having superior lubricating qualities, particularly when applied under relatively high temperature conditions.

The invention contemplates the preparation of a grease substantially free from water and composed essentially of a high melting point soap compounded with a high boiling point hydrocarbon oil. The oil employed is of the type generally known to the trade as cylinder oil or cylinder stock and preferably embraces a residual product derived from the distillation of paraffin or semi-paraffin base crudes. A steam refined cylinder stock gives the best results. Various soaps may be used and various fatty oils and fatty acids may be employed in the preparation of the soaps. We prefer, however, to use a soda soap and to prepare the soap from animal fatty oils, such as tallow or tallow oil, and in general prefer to use fatty oils of relatively high melting point or having a comparatively high degree of saturation. Hydrogenated fats, fish and vegetable stearins and the like may be used to advantage. The proportions of soap and cylinder stock used varies with the particular soap and oil used and with the specific characteristics of the product desired.

In order to more fully describe the invention we will now proceed to give a specific example thereof it being understood that we do not thereby intend to limit the invention to the particular proportions and ingredients given. In this particular example of the invention a lubricating composition suitable for use in locomotive driving journals and the like was prepared with the following ingredients.

| | Lbs. |
|---|---|
| Flake caustic soda | 432 |
| Hard tallow | 2680 |
| Steam refined cylinder stock | 2888 |

In preparing the compound with the above ingredients the caustic soda was dissolved in water, mixed with the tallow and heated to produce saponification after which the cylinder stock was added and the mixture heated to remove substantially all the water. An analysis of the product formed in the treatment disclosed the following composition:

| | Per cent. |
|---|---|
| Soda soap | 46.00 |
| Free NaOH | 0.40 |
| $C_3H_5(OH)_3$ | 4.76 |
| S. R. cylinder stock | 48.14 |
| $H_2O$ | 0.40 |
| Total | 99.70 |

The product at atmospheric temperatures was found to be of a rather soft and sticky character, as compared with other driving journal compounds now in use, but it has been found to be more stable under increased temperatures than these compounds, its melting point being around 450° F. It retains its peculiar greasy character and efficient lubricating qualities at temperatures above the boiling point of water.

In practicing the invention it is desirable, although not necessary, to prepare the soap prior to the addition of the lubricating oil. The sodium hydroxid, or other suitable neutralizing or saponifying agent, is mixed with the fatty oil, such for example as tallow or tallow oil. The mixture is boiled for several hours or until the reaction is completed after which the heating is continued to remove from the soap the major portion of the water content. The cylinder oil is then added and the mass is heated to a temperature substantially above the boiling point of water and above the melting point of the mixture. This temperature is generally about 450° to 500° F. or higher. Care, however, should be taken so as not to raise the temperature above the flash point of the cylinder stock used. The mass is maintained at the elevated temperature for a period of time, usually several hours, until substantial dehydration is effected. During the heating occasional or intermittent stirring or agitation is carried on. The final product should not contain any material quantity of water, although a trace of water appears to be necessary in order to insure a homogeneous mixture having the soap in colloidal suspension in the oil, that is, having the constituents in the form of a homogeneous emulsion. The slight quantity present produces no ill effect, however, and the product may for practical purposes be considered as dehydrated.

The product is drawn off while in a liquid condition and placed in suitable containers or molds. It is desirable to draw the product directly into molds so as to form grease cakes convenient for shipment and use. In many cases the melting point of the mixture is so high that when the product is removed in a liquid condition there is a greater or less quantity of hydrocarbon vapor present and while the material is cooling in the molds it is desirable to occasionally break the skin which forms on the surface in order to permit the escape of entrained vapors and thus prevent the formation of oil pockets in the grease cake.

The grease cake thus produced is of a relatively high melting point and because it is stable under comparatively high temperatures it is particularly adapted for the lubrication of bearings working under high speeds and carrying heavy loads wherein considerable heat is generated, such for example as locomotive driving journals. The invention also contemplates, however, the preparation of greases suitable for low speed bearings carrying heavy loads and subjected to high temperatures, such as the bearings of rotary kilns and the like.

While the grease described in the foregoing specific example had a melting point of about 450° F., this physical property may vary over a considerable range. Dehydrated greases of the prior art have melting points considerably lower than this range, the highest of which are of the order of 300° F. The grease of this invention differs from the prior art greases, in general, by having a melting point of a higher order which may, for the sake of convenience, be designated as of the order of over 400° F. As far as we are aware, dehydrated greases having melting points of this order were unknown in the prior art.

The product of our invention possesses lubricating qualities of a superior nature and is much more efficient as a lubricant than any grease composition of which we are aware. Its use effects a material economy in grease consumption. When applied to bearings it has a tendency to keep the bearing surfaces smooth and tends to smooth bearing surfaces which before it was applied had a tendency to run rough. It maintains the journal at lower temperatures than other lubricants. Less abrasion or cutting of the bearing surfaces is observed when it is used. The application of our lubricant to a bearing operates to form an oily film on the bearing surface which insures proper lubrication. While the advantages of the invention are particularly noticeable when the lubricant is applied to bearings subjected to the higher temperatures, that is temperatures around the boiling point of water, or higher, the advantages are nevertheless to be observed in the case of bearings operating under lower temperatures.

Obviously many modifications and variations of the invention, as hereinbefore set forth, may be made without departing from the spirit and scope thereof, and therefore, only such limitations should be imposed as are indicated in the appended claims.

What we claim is:

1. A substantially anhydrous lubricating grease comprising about equal portions of cylinder stock and a soap prepared from tallow and caustic soda, said cylinder stock and soap both being present in large amount.

2. A substantially anhydrous lubricating grease comprising cylinder stock and a soap, prepared from tallow and caustic soda, and having a melting point of about 450° F.

3. A lubricant comprising a dehydrated mixture of cylinder stock and a soda soap, said cylinder stock and soap being present in about equal proportions and both being present in large amount.

4. A lubricating grease comprising a substantially dehydrated mixture of a viscous hydrocarbon oil and the nonvolatile reaction products of caustic soda and tallow, and having a melting point of the order of over 400° F.

5. A lubricating grease comprising a substantially dehydrated mixture of a viscous hydrocarbon oil and a soda soap, and having a melting point of the order of over 400° F.

6. A lubricating grease comprising a substantially dehydrated mixture of a viscous hydrocarbon oil and a soda soap, having a melting point of the order of over 400° F. and adapted to be heated above its melting point without losing its homogeneity.

7. A lubricating grease comprising a mixture of a viscous hydrocarbon oil and a soda soap, and having a water content of less than one per cent, and melting at a temperature of the order of over 400° F.

8. The process of manufacturing lubricants, which comprises preparing a soap by reacting sodium hydrate with a fat, heating the reaction products to remove a portion of the water, adding a viscous hydrocarbon oil to the reaction products and heating the mixture to a temperature between 450° and 500° F. to remove most of the remaining water.

In witness whereof I have hereunto set my hand this 13 day of September, 1923.
M. C. VAN GUNDY.

In witness whereof I have hereunto set my hand this 11th day of September, 1923.
J. R. SCANLIN.

hydrocarbon oil and a soda soap, and having a melting point of the order of over 400° F.

6. A lubricating grease comprising a substantially dehydrated mixture of a viscous hydrocarbon oil and a soda soap, having a melting point of the order of over 400° F. and adapted to be heated above its melting point without losing its homogeneity.

7. A lubricating grease comprising a mixture of a viscous hydrocarbon oil and a soda soap, and having a water content of less than one per cent, and melting at a temperature of the order of over 400° F.

8. The process of manufacturing lubricants, which comprises preparing a soap by reacting sodium hydrate with a fat, heating the reaction products to remove a portion of the water, adding a viscous hydrocarbon oil to the reaction products and heating the mixture to a temperature between 450° and 500° F. to remove most of the remaining water.

In witness whereof I have hereunto set my hand this 13 day of September, 1923.

M. C. VAN GUNDY.

In witness whereof I have hereunto set my hand this 11th day of September, 1923.

J. R. SCANLIN.

DISCLAIMER 1,599,854.—*Morris C. Van Gundy*, Houston, and *Joseph R. Scanlin*, Port Arthur, Tex. MANUFACTURE OF LUBRICANTS. Patent dated September 14, 1926. Disclaimer filed February 18, 1937, by the assignee, *The Texas Company*.

Hereby enters this disclaimer to claims 1, 2, 3, 5, 6, and 7 of said Letters Patent.
[*Official Gazette March 30, 1937*]

DISCLAIMER 1,599,854.—*Morris C. Van Gundy*, Houston, and *Joseph R. Scanlin*, Port Arthur, Tex.
MANUFACTURE OF LUBRICANTS. Patent dated September 14, 1926. Disclaimer filed February 18, 1937, by the assignee, *The Texas Company*.

Hereby enters this disclaimer to claims 1, 2, 3, 5, 6, and 7 of said Letters Patent.
[*Official Gazette March 30, 1937*]